(12) United States Patent
Marcus

(10) Patent No.: US 6,230,188 B1
(45) Date of Patent: May 8, 2001

(54) SYSTEM AND METHOD FOR PROVIDING A PROXY IDENTIFIER IN AN ON-LINE DIRECTORY

(75) Inventor: Kevin R. Marcus, Redmond, WA (US)

(73) Assignee: InfoSpace, Inc., Bellevue, WA (US)

( * ) Notice: Subject to any disclaimer, the term of this patent is extended or adjusted under 35 U.S.C. 154(b) by 0 days.

(21) Appl. No.: 09/207,391

(22) Filed: Dec. 8, 1998

(51) Int. Cl.⁷ .................................................. G06F 13/00
(52) U.S. Cl. ......................... 709/206; 709/225; 709/313
(58) Field of Search .................................. 709/204, 206, 709/223, 224, 225, 373, 317, 328, 329

(56) References Cited

U.S. PATENT DOCUMENTS

| | | |
|---|---|---|
| 5,742,769 | 4/1998 | Lee et al. . |
| 5,813,006 * | 9/1998 | Polnerow et al. ...................... 707/10 |
| 5,822,526 * | 10/1998 | Waskiewicz .......................... 709/206 |

\* cited by examiner

Primary Examiner—Viet D. Vu
(74) Attorney, Agent, or Firm—Christensen O'Connor Johnson Kindness PLLC; Anthony B. Claiborne, Esq.

(57) ABSTRACT

A method for protecting the privacy of a person's email address that is maintained in an on-line directory service (14). The directory service includes a database (16) having actual email addresses and a processing system (20) that is available for retrieving these listings from the database. The method includes the computer implemented steps of receiving from a user a request for a person's email address; determining whether or not a record is present in the database that corresponds with the user request; and if a record is present that includes a person's actual email address, then automatically displaying a selectable proxy email address (38) in lieu of the person's actual email address. The proxy email address is provided without having been requested by the person and without requiring the processing system to determine whether or not the person prefers to have a proxy email address displayed or the person's actual email address displayed. The proxy email address includes a selectable portion that enables the user to send an email message to the person without knowing that person's actual email address.

40 Claims, 3 Drawing Sheets

SYSTEM AND METHOD FOR PROVIDING A PROXY IDENTIFIER IN AN ON-LINE DIRECTORY

FIELD OF THE INVENTION

The present invention relates to on-line directory services, and more particularly to on-line directory services for obtaining email addresses.

BACKGROUND OF THE INVENTION

Various types of commercial on-line directory services are available for access by the general public. These services are generally structured to include both "yellow pages" information as well as "white pages" information. By accessing the directory service through the Internet via particular web pages, a user can typically enter information about a third party, including such items as first name, last name, address, etc. The user then selects a search, or go, type button to initiate the search. Once initiated, the on-line directory service provider performs a computer search of various databases to determine whether a match is available. If so, the information is then displayed to the user.

Providing on-line information about a third party to a user, however, raises various issues regarding the privacy of that third party. With telephone numbers, there are currently ways to keep a number private if the third party does not wish the general public to have access to his or her telephone 1number. This usually takes the form of the person having an unlisted telephone number so that it is not actually entered into a yellow pages or white pages paper directory. On-line Internet directories are generally created using the paper directory or an authorized electronic version of those listings. Therefore, when the on-line Internet directories are created, there is little chance that an unlisted telephone number will be available therein, since it was unobtainable from the source.

Keeping a person's e-mail address private, however, is not so easily accomplished. One system described in U.S. Pat. No. 5,742,769 provides a system whereby a particular party can register with the directory service provider and receive, as a benefit of their registration, the ability to configure their listing for various levels of privacy. In particular, the '769 patent allows a user to display the third party's listing information, display no listing information, display portions of the listing, or display an e-mail address as a "knock— knock" item. If the user selects the knock—knock feature, the general public is allowed to send an e-mail message to the particular party without actually having obtained that third party's e-mail address. If the third party wishes to respond to the user, then he or she may send a reply e-mail, thus giving that user his or her actual e-mail address.

The '769 registration system for altering the display of an e-mail address and providing a knock—knock feature is useful, however, it has a number of disadvantages. A first disadvantage is that unless a user is aware of that particular on-line directory service, then the responsibility of determining whether a user would like to keep his or her listing information private is up to the on-line directory service. It is cumbersome, as well as unlikely, for an on-line directory service to take the time necessary to poll each individual listing as to whether he or she would prefer to have their information public or private. Thus, it is highly likely for an on-line directory service to unwittingly make public, email address information that a person would prefer to have kept private.

A second disadvantage is that the '769 patent is that it is cumbersome. It appears to require the person to register with the on-line directory service and to select a privacy option before being able to allow the third party listing to take advantage of such a feature. Most people are unwilling to go to the effort of registering in order to take advantage of such a system, especially since the person may not even know that their email address is listed with that particular directory service and further may feel that since the listing is shown publicly to begin with, there would be no point in now making it private.

A third problem is that spammers routinely gather e-mail information from on-line directory services and resell this information to individuals and businesses for marketing purposes. These e-mail addresses are sold in large batches and contain e-mail addresses from all over the world. While spam e-mail is undesirable in the United States simply because it wastes computing resources and is a nuisance to clear out of one's e-mail box, it is a much more significant problem in Europe where many countries charge their e-mail addressees for each piece of e-mail received.

Thus, a need exists for an on-line directory service that has an improved system for dealing with privacy issues regarding e-mail addresses. The present invention is directed to fulfilling this need.

SUMMARY OF THE INVENTION

In accordance with aspects of the present invention, a method for protecting the privacy of a person's full email address in an on-line directory service database record is provided. The directory service includes a processor available for retrieving such listings from the database. The method includes the computer implemented steps of receiving from a user a request for a person's email address and determining whether or not a record is present in the database that corresponds with the user request. If a record is present that includes a person's actual email address, then the processing system automatically displays a selectable proxy address in lieu of the person's actual email address. The proxy address is provided without having been requested by the person and without requiring the processing system to determine whether or not the person prefers to have a proxy email address displayed or the person's actual email address displayed. The proxy email address includes a selectable portion that enables the user to send an email message to the person without knowing that person's actual email address.

In accordance with other aspects of this invention, an on-line directory service is provided including a database of information including actual email addresses and a processing system. The processing system receives a user request for an actual email address and in response, determines the actual email address from the database. Upon finding the actual email address, the processing automatically provides the user with a selectable proxy email address and not the actual email address.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
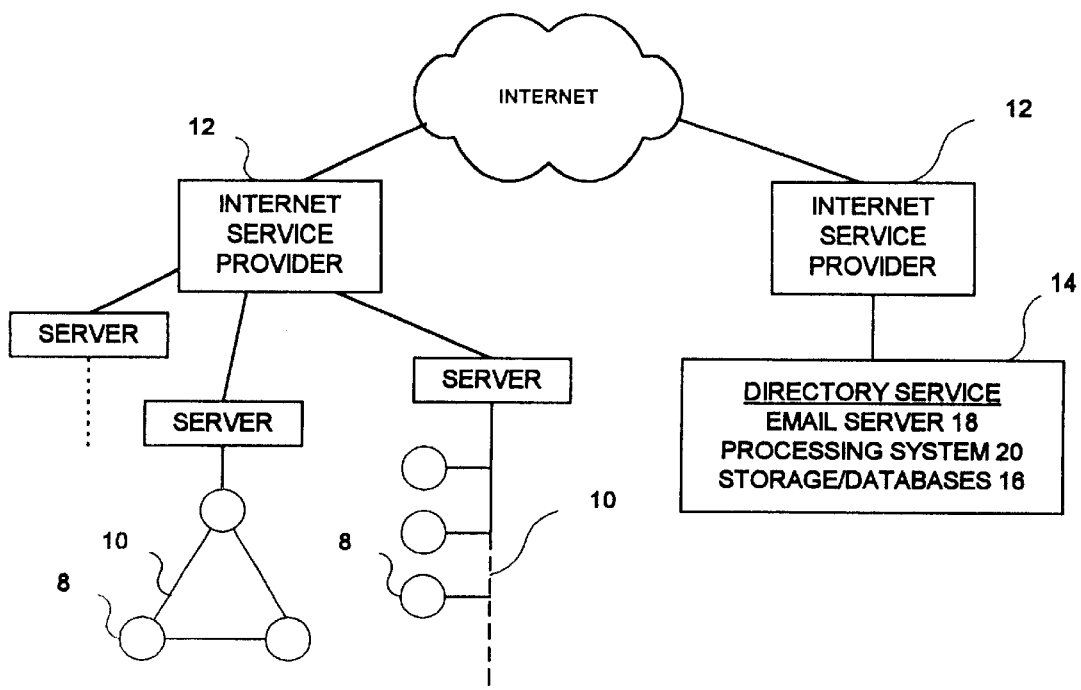
FIG. 1 is a block diagram of a directory service within a network.

Referring to FIG. 1, individual users 8 are interconnected through any number of different types of networks 10, including local area networks (LANs) or regional networks accessed over telephone lines, such as commercial information services. Each user 8 has access to the Internet via an Internet Service Provider 12 using any one of a number of commercially available browsers. Once connected to the Internet, a user 8 can access on-line directory services 14 that are typically located on the World Wide Web and are generally publicly accessible using a hypertext transfer protocol (HTTP). A user enters an HTTP request using the browser and receives back the requested web page of that particular on-line directory service provider.

The on-line directory service 14 electronically maintains a number of large databases (or more generically, electronic "storage") 16 that have listings, or records, for of its entrants. This directory service database is accessible over the Internet using the service's web site. Most directory service web sites are arranged in a format that includes both "White Pages" and "Yellow Pages". The records contain basic information such as first name, last name, address, etc. As stated in the background section, the database records are typically compiled from sources such as telephone records and published phone books.

Still referring to FIG. 1, the directory service 14 includes an email server 18 and a processing system 20. The processing system 20 has a number of computers, or gaters, each of which is linked to the storage either directly or through an intermediate switching network. A user accesses the directory service over the Internet and through a firewall that protects the service from external tampering.

Figure 2:
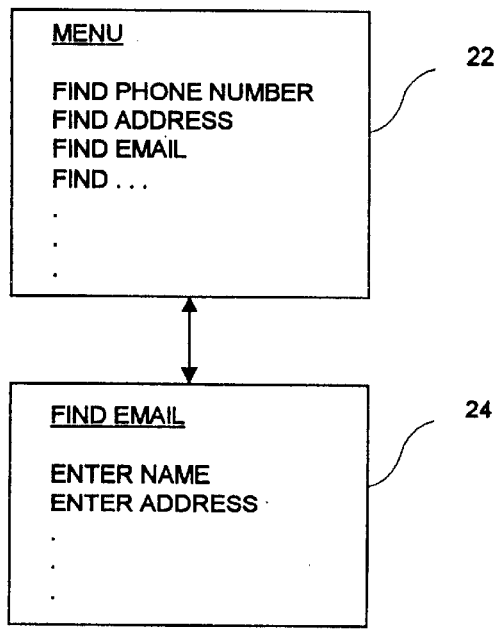
FIG. 2 is a chart of menus and input screens.

Referring to FIG. 2, when the user accesses the service through a standard URL identifier, the processing system 20 provides to the user a menu 22 that includes one or more request choices for finding various types of data available from that particular directory service. These choices are selected using a keyboard or pointing device, such as a mouse or trackball. Shown in FIG. 2 are the choices to "FIND PEOPLE", "FIND ADDRESS", "FIND EMAIL", etc. Upon selection of the FIND EMAIL choice, the user is provided with another display page 24 requesting the user to enter various search parameters.

Figure 3:
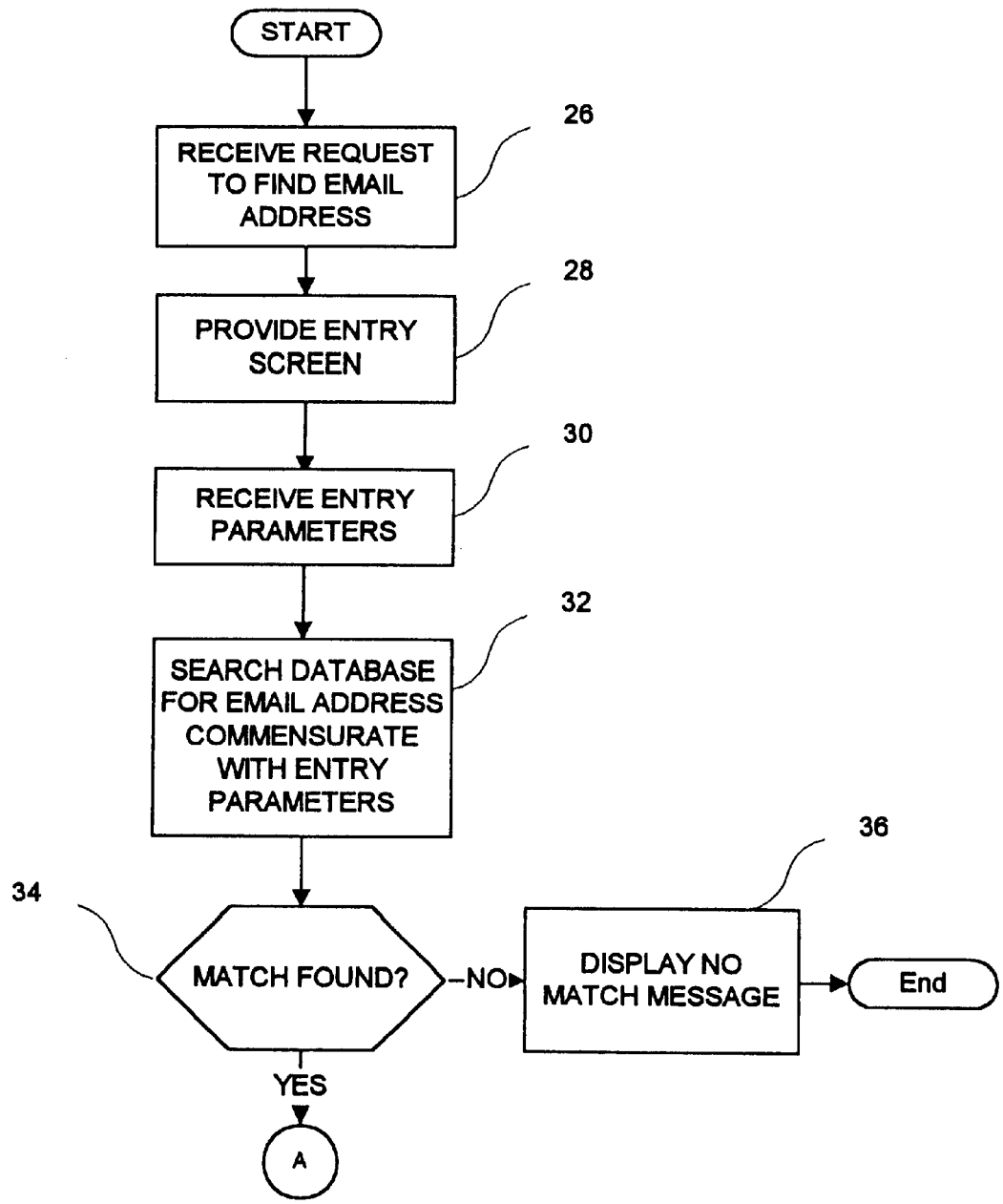
FIGS. 3 and 4 are flow charts illustrating a method of processing a user's request for an email address formed in accordance with the present invention.

In FIG. 3, when the user selects the menu item to find email an address, the processing system 20 receives the request at block 26 and in response provides at block 28 an entry screen with fields for the user to enter various types of data useful in searching for the correct listing. This may include such items as a name or address. The user enters this information and submits the parameters to the processing system using selection buttons on the web page. The system receives the entry parameters at block 30 and conducts a search of the database to find the record (or records) that match the entry parameters at block 32. If no match is found, a display message is provided back to the user at block 34.

Figure 4:
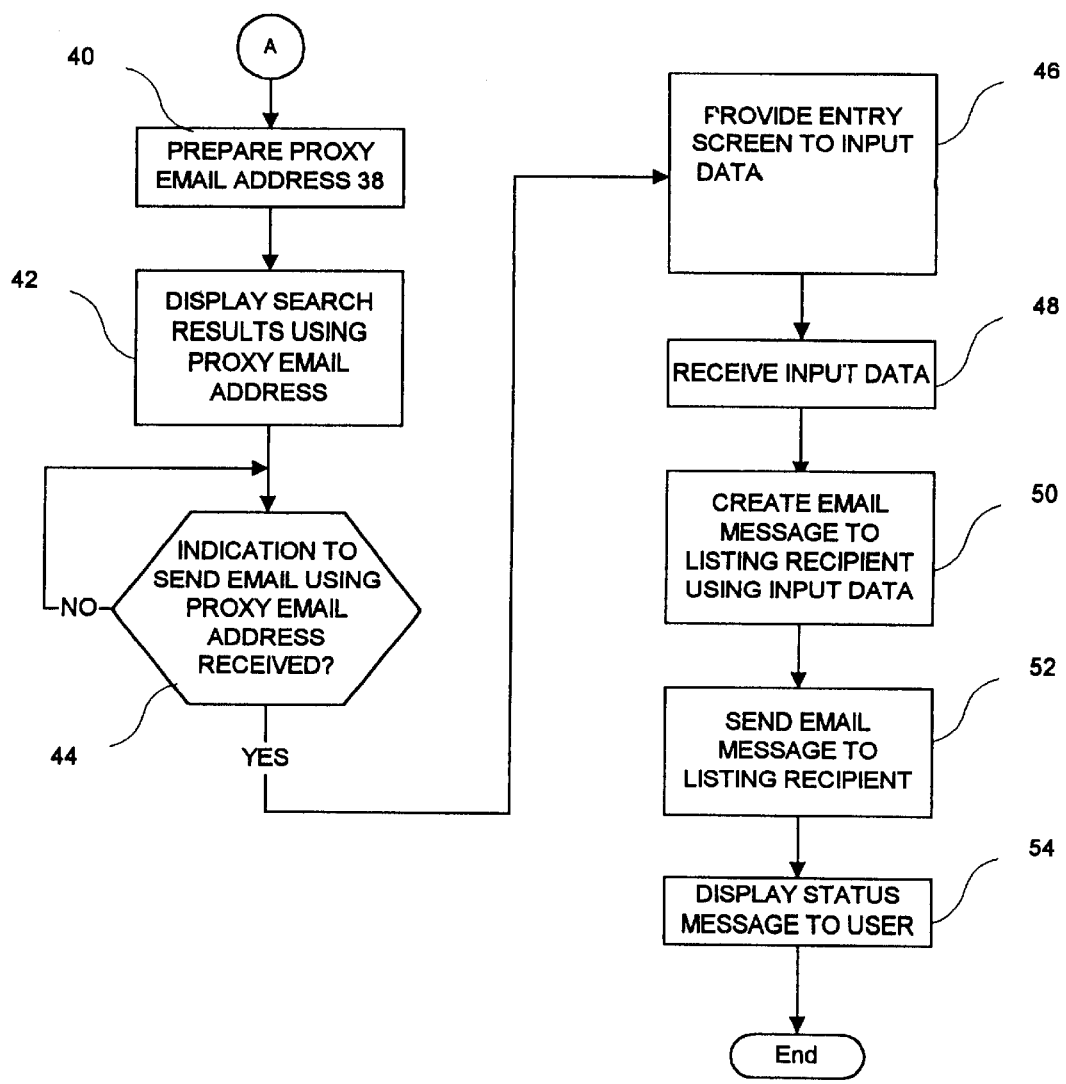

If one or more matches are found, the logic proceeds to FIG. 4, where the processing system 20 prepares a proxy email address 38 for each record found at block 40. The processing system 20 displays each search result at block 42 using the prepared proxy email address 38 instead of the record's actual email address. In one embodiment, the proxy email address 38 includes a first portion and a second portion. The first portion is provided in lieu of the listing's alias, or user name, and is given as a selectable word, such as "Send", with underlining to indicate to the user that the text is a selectable link. The second portion is given as the listing's domain name. This is helpful to users in order to narrow the selection of a party of interest when more than one person is matched for a given set of entry parameters. Other formats of proxy email addresses may be used.

In a second embodiment, the proxy email address 38 includes two selectable portions. A first selectable portion is similar to the first portion described in the embodiment above. A second selectable portion is provided that, once selected, allows the user to send an email message to all persons in that domain. Alternatively, a second selectable portion may be provided that, once selected, gives a list of all users on that domain as known in the directory service. In another alternative embodiment, a second selectable portion is provided that, once selected, provides information to the user regarding that particular domain service. As will be appreciated, other embodiments of selectable and non-selectable portions are possible.

Still referring to FIG. 4, the processing system 20 checks at block 44 to determine whether the user has selected the proxy email address. If so, the processing system 20 provides the user at block 46 with an email entry screen having one or more entry boxes for the user enter information relevant to the email message. For example, in one embodiment, the user may enter a subject description, the user's name, and a message for the receiving party. Also included is a box for entering the user's email address. This address is required for embodiments in which the user wishes the recipient to respond back directly to the user. This address is optional for embodiments in which the user wishes to remain completely anonymous.

Once the user has entered the data in the email entry page, the user selects an item on the display screen that causes the data to send the information to the processing system where it is received at block 48. The processing system 20 creates an email message using this input information at block 50. In one embodiment, the created email message shows the directory service as the sending party and indicates in the email message text the user's inputted email address as the true sender. In another embodiment, the created email message shows the user's inputted email address as the sender. In yet another embodiment, the created email message shows the directory service as the sending party and does not include any mention of the user's email address of the user as the true sender. If the user did not provide a return email address, the directory service furnishes the user with a identification means that allows the user to pickup return email messages from the directory service. For example, the user is provided with a randomly-generated reference number. The user may request via telephone, email, or web access, any messages corresponding to that reference number.

Numerous variations in the types of messages actually sent to the listing party are possible. In one embodiment, the directory service provides a marketing banner or tag at the end of the email message text, indicating that the service was sponsored by a particular business, for example. In another embodiment, a message is inserted explaining to the recipient that the user does not have the person's actual email address, but instead is using the directory service to contact the person in a privacy-respecting manner. In another embodiment, a message is inserted warning the recipient that by hitting the reply button in response to this message, will cause the person's actual email address to be sent to the user-sender. Once the email message is prepared, the processing system 20 sends the email to the listing party at block 52. A display is preferably provided at item 54 to the user indicating the status of the send email, i.e., whether it was accomplished successfully, whether it was put into a queue, or whatever the case may be.

As will be appreciated from a reading of the above, the present invention greatly increases the privacy of an individual with regard to their email address. This is accomplished in an automatic manner, so that even if a listed party is not aware that they are listed with that particular directory service, the listed party is in no jeopardy of having their email address made publicly available through the directory service. In addition, even if the party is aware that they are listed with a particular directory service, the person does not have to go to the trouble of registering with the service and/or altering the status of whether their email address is to be shown.

In accordance with the present invention, a person's actual full email address is preferably not ever provided, even though the person would like to have their email address made public. This helps to reduce the amount of spam email. It is possible to practice the present invention by allowing the person to change his or her email address from being private to being public, though it is not preferred.

The present invention also aids in reducing the damage caused by spam email by reducing public access to email addresses. While the preferred embodiment of the invention has been illustrated and described, it will be appreciated that various changes can be made therein without departing from the spirit and scope of the invention. For example, currently people and/or machines are known to scan web sites for email addresses. Once obtained, these email addresses are collected and sold to spammers. The present invention may be used by web page owners to protect those email addresses listed on their web site pages, thereby prohibiting the collection and subsequent sale of their email address and consequently reducing junk email. Thus, it is to be appreciated that the present invention email proxy system could be applied to any web page containing an email address in which the recipient prefers to have an email address that is private while still retaining the ability to receive emails.

The embodiments of the invention in which an exclusive property or privilege is claimed are defined as follows:

1. A method for retrieving listings from a database, the method comprising:
    (a) obtaining a request for a party's email address;
    (b) determining whether a record is present in the database that corresponds with the request; and
    (c) if a record is present that corresponds to the request, then automatically displaying a selectable proxy address in lieu of the party's actual email address; the proxy address being displayed without requiring participation by the party and without determining whether the party prefers to have a proxy email address displayed;
    wherein the proxy email address includes a selectable portion that enables a sender to send an email message to the party without knowing the party's actual email address.

2. The method according to claim 1, wherein the proxy email address includes a selectable first portion and a second portion, the second portion including a reference to a domain name associated with the party's email account.

3. A method for providing a proxy identifier in an on-line directory, the method comprising:
    obtaining a request for an email address, wherein the request includes one or more attributes for identifying the email address;
    obtaining at least one record associated with the one or more attributes from a listing database; and
    automatically displaying a selectable proxy address corresponding to the at least one record;
    wherein the selectable proxy address enables a sender to send an email communication without knowing an actual email address; and
    wherein the automatic display of the selectable proxy address is performed without participation by a party associated with the email address and without determining a privacy setting for any matching records.

4. The method as recited in claim 3, wherein the proxy address includes a selectable first portion and a second portion, the second portion including a reference to a domain name associated with the party's email account.

5. The method as recited in claim 3 further comprising:
    obtaining a selection of the selectable proxy address; and
    displaying a data entry display to enable the user to prepare a message, wherein the data entry display allows the sender to prepare a message to the party corresponding to the email address.

6. The method according to claim 1, wherein the email message includes an additional message regarding the context under which the message is being sent.

7. The method according to claim 1, wherein the email message includes a marketing message.

8. The method according to claim 1, wherein the email message does not reveal the identity of the sender.

9. The method according to claim 1, wherein the email message identifies an actual email address of the sender.

10. The method according to claim 9, wherein the email message includes a warning message indicating that replying to the email message will cause the person's email address to be divulged to the sender.

11. An on-line directory service comprising:
    (a) a database of information including actual email addresses;
    (b) a processing system that receives a user request for a party's actual email address and in response, determines the actual email address from the database; upon finding the actual email address, the processing automatically provides the user with a selectable proxy email address and not the actual email address;
    the proxy address being provided without having been requested by the party and without requiring the processing system to determine whether the party prefers to have a proxy email address displayed;
    wherein selection of the proxy email address enables the user to send an email message to the party without knowing the party's actual email address.

12. The on-line directory according to claim 11, wherein the proxy email address includes a selectable first portion and a second portion, the second portion including a reference to a domain name associated with the party's email account.

13. The on-line directory service according to claim 11, wherein upon selection of the selectable portion of the proxy email address, the processing system provides a data entry display that enables the user to prepare a message to the party.

14. The on-line directory service according to claim 13, wherein after entering the information on the data entry display, the user transmits the information to the processing system; the processing system then preparing and sending an email message to the person using the information.

15. The on-line directory service according to claim 11, wherein upon selection of the selectable portion of the proxy email address, the processing system provides a data entry display that requires the user to enter their return email address.

16. The on-line directory service according to claim 11, wherein the email message sent to the person includes an additional message regarding the context under which the message is being sent.

17. The on-line directory service according to claim 11, wherein the email message sent to the person includes a marketing message.

18. The on-line directory according to claim 11, wherein the email message does not reveal the identity of the sender.

19. The on-line directory according to claim 11, wherein the email sent to the party identifies an actual email address of the user.

20. The on-line directory service according to claim 19, wherein the email message sent to the person includes a warning message indicating that by replying to the email message using the user's email return address will cause to the person's email address to be divulged to the user.

21. The method as recited in claim 1 further comprising:
obtaining a selection of the selectable proxy address; and
displaying a data entry display to enable the user to prepare a message, wherein the data entry display allows the sender to prepare a message to the party corresponding to the email address.

22. The method according to claim 21 further comprising requiring the sender to enter a return email address.

23. The method as recited in claim 21 further comprising:
obtaining the sender message prepared on the data entry display; and
transmitting an email to the party corresponding to the email address including the sender message.

24. The method as recited in claim 2, wherein the second portion of the selectable proxy address is selectable, the method further comprising:
obtaining a selection of the second portion of the selectable proxy address; and
displaying a list of all records corresponding to the request and having the domain name represented by the second portion of the proxy address.

25. The method as recited in claim 8, wherein the email message identifies the sender by a numeric identifier.

26. The method as recited in claim 25 further comprising:
obtaining a request from a sender to view any email responses to the sender identified by a numeric identifier; and
displaying a set of responses corresponding to the unique numeric identifier of the sender.

27. A computer-readable medium having computer-executable instructions operable for performing the method recited in any one of claims 1, 2, 6–10, or 21–26.

28. A computer system having a processor, a memory and an operating environment, the computer system operable for performing the method recited in any one of claims 1, 2, 6–10, or 21–26.

29. The method according to claim 5 further comprising requiring the sender to enter a return email address.

30. The method as recited in claim 5 further comprising:
obtaining the user message prepared on the data entry display; and
transmitting an email to the party corresponding to the email address including the sender message.

31. The method as recited in claim 5, wherein the second portion of the selectable proxy address is selectable, the method further comprising:
obtaining a selection of the second portion of the selectable proxy address; and
displaying a list of all records corresponding to the request and having the domain name represented by the second portion of the proxy address.

32. The method as recited in claim 3, wherein the email message includes an additional message regarding the context under which the message is being sent.

33. The method as recited in claim 3, wherein the email message includes a marketing message.

34. The method as recited in claim 3, wherein the email message does not reveal the identity of the sender.

35. The method as recited in claim 34, wherein the email message identifies the sender by a numeric identifier.

36. The method as recited in claim 35 further comprising:
obtaining a request from a sender to view any email responses to the sender identified by a numeric identifier; and
displaying a set of responses corresponding to the unique numeric identifier of the sender.

37. The method as recited in claim 3, wherein the email message identifies an actual email address of the sender.

38. The method as recited in claim 37, wherein the email message includes a warning message indicating that replying to the email message will cause the person's email address to be divulged to the user.

39. A computer-readable medium having computer-executable instructions for performing the method recited in any one of claims 3–38.

40. A computer system having a processor, a memory and an operating environment, the computer system operable for performing the method recited in any one of claims 3–38.

\* \* \* \* \*

UNITED STATES PATENT AND TRADEMARK OFFICE
CERTIFICATE OF CORRECTION

PATENT NO. : 6,230,188 B1　　　　　　　　　　　　　　　　　　　　Page 1 of 1
DATED : May 8, 2001
INVENTOR(S) : K.R. Marcus It is certified that error appears in the above-identified patent and that said Letters Patent is hereby corrected as shown below:

<u>Column 8,</u>
Line 46, "claims 3-38." should read -- claims 3-5 or 29-38. --
Line 49, "claims 3-38." should read -- claims 3-5 or 29-38. --

Signed and Sealed this

Nineteenth Day of February, 2002

Attest:

JAMES E. ROGAN
*Attesting Officer*　　　*Director of the United States Patent and Trademark Office*